(12) United States Patent
Horiuchi et al.

(10) Patent No.: US 12,514,526 B2
(45) Date of Patent: Jan. 6, 2026

(54) MAMMOGRAPHY APPARATUS, DISPLAY METHOD OF MAMMOGRAPHY APPARATUS, AND MEDICAL IMAGE ACQUISITION SYSTEM

(71) Applicant: FUJIFILM Corporation, Tokyo (JP)

(72) Inventors: Hisatsugu Horiuchi, Kanagawa (JP); Lisako Nobuyama, Kanagawa (JP); Koji Shimomura, Kanagawa (JP); Takeyasu Kobayashi, Kanagawa (JP); Sayaka Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/916,267

(22) Filed: Oct. 15, 2024

(65) Prior Publication Data

US 2025/0134482 A1    May 1, 2025

(30) Foreign Application Priority Data

Oct. 26, 2023 (JP) ................. 2023-184270

(51) Int. Cl.
| | |
|---|---|
| *A61B 6/46* | (2024.01) |
| *A61B 6/00* | (2024.01) |
| *A61B 6/02* | (2006.01) |
| *A61B 6/04* | (2006.01) |
| *A61B 6/50* | (2024.01) |
| *A61B 8/00* | (2006.01) |
| *A61B 8/08* | (2006.01) |

(52) U.S. Cl.
CPC ............. *A61B 6/502* (2013.01); *A61B 6/025* (2013.01); *A61B 6/0414* (2013.01); *A61B 6/4417* (2013.01); *A61B 6/462* (2013.01); *A61B 8/0825* (2013.01); *A61B 8/462* (2013.01)

(58) Field of Classification Search
CPC ................. A61B 6/502; A61B 6/462
See application file for complete search history.

(56) References Cited

U.S. PATENT DOCUMENTS

| 11,529,114 | B2 | 12/2022 | Matsuura et al. | |
|---|---|---|---|---|
| 2009/0088637 | A1 | 4/2009 | Mikami | |
| 2009/0101828 | A1* | 4/2009 | Nakata | H04N 23/60 |
| | | | | 250/580 |
| 2012/0029344 | A1 | 2/2012 | Nakayama | |
| 2013/0039456 | A1 | 2/2013 | Seppala et al. | |
| 2013/0039467 | A1 | 2/2013 | Seppala et al. | |
| 2013/0044855 | A1 | 2/2013 | Laukkanen | |
| 2013/0044857 | A1 | 2/2013 | Kinnunen | |

(Continued)

FOREIGN PATENT DOCUMENTS

| JP | 2009-082402 A | 4/2009 |
|---|---|---|
| JP | 2012-029785 A | 2/2012 |

(Continued)

*Primary Examiner* — Colin T. Sakamoto
(74) *Attorney, Agent, or Firm* — Studebaker Brackett PLLC

(57) ABSTRACT

A display unit is provided on a side surface of an arm part. Then, a mechanism that rotates the display unit in conjunction with rotation of the arm part is provided between the display unit and the arm part. A 3-axis gimbal mechanism is applied as an example of the mechanism that rotates the display unit in conjunction with the rotation of the arm part, and the display unit is rotated in conjunction with the rotation of the arm part.

9 Claims, 12 Drawing Sheets

(56) References Cited

U.S. PATENT DOCUMENTS

| | | | |
|---|---|---|---|
| 2013/0051517 A1 | 2/2013 | Hyvarinen et al. | |
| 2013/0051518 A1 | 2/2013 | Laukkanen et al. | |
| 2013/0064347 A1 | 3/2013 | Laukkanen et al. | |
| 2013/0072787 A1* | 3/2013 | Wallace | A61B 90/50 600/424 |
| 2016/0270751 A1* | 9/2016 | Laukkanen | A61B 6/4435 |
| 2017/0020471 A1* | 1/2017 | Laukkanen | A61B 6/462 |
| 2017/0319152 A1 | 11/2017 | Laukkanen et al. | |
| 2018/0108447 A1* | 4/2018 | Turner | A61B 6/4405 |
| 2018/0135797 A1* | 5/2018 | Lee | A61B 5/7445 |
| 2018/0296174 A1* | 10/2018 | Barker | A61B 6/4441 |
| 2019/0212785 A1* | 7/2019 | Choi | F16M 11/10 |
| 2019/0246998 A1* | 8/2019 | Liu | A61B 6/4441 |
| 2020/0100759 A1 | 4/2020 | Matsuura et al. | |
| 2021/0128091 A1* | 5/2021 | Youd | A61B 6/462 |
| 2022/0031262 A1* | 2/2022 | Cowles | A61B 6/025 |
| 2022/0233165 A1* | 7/2022 | Park | A61B 6/5247 |
| 2024/0341709 A1* | 10/2024 | Ledan | A61B 6/4435 |
| 2025/0127471 A1* | 4/2025 | Horiuchi | A61B 8/0825 |
| 2025/0134482 A1* | 5/2025 | Horiuchi | A61B 8/0825 |

FOREIGN PATENT DOCUMENTS

| | | | |
|---|---|---|---|
| JP | 2013-534432 A | | 9/2013 |
| JP | 2020-048999 A | | 4/2020 |
| JP | 2023115845 A | * | 8/2023 |

* cited by examiner

MAMMOGRAPHY APPARATUS, DISPLAY METHOD OF MAMMOGRAPHY APPARATUS, AND MEDICAL IMAGE ACQUISITION SYSTEM

CROSS-REFERENCE TO RELATED APPLICATIONS

This application claims priority under 35 USC 119 from Japanese Patent Application No. 2023-184270 filed on Oct. 26, 2023, the disclosure of which is incorporated by reference herein.

BACKGROUND

1. Technical Field

The present disclosure relates to a mammography apparatus, a display method of the mammography apparatus, and a medical image acquisition system.

2. Description of the Related Art

JP2012-29785A has proposed a radiation image capturing method of irradiating a subject with radiation from a plurality of different imaging directions by moving a radiation source and capturing a radiation image for each imaging direction by the irradiation with the radiation, in which images are acquired by a modality that acquires images related to biological information of the subject other than radiation images while the radiation source is moved from a predetermined imaging direction to the next imaging direction.

JP2020-48999A has proposed an information processing apparatus including an acquisition unit that acquires radiography information in a case of capturing a radiation image of a breast, and a generation condition setting unit that sets generation conditions for generating an ultrasound image of the breast on the basis of the radiography information acquired by the acquisition unit.

JP2009-82402A has proposed a medical image diagnosis system including a medical imaging apparatus that acquires a radiation image of an object projected onto a projection plane by irradiating the object with radiation, acquires an ultrasound image of the object by transmitting and receiving ultrasound waves to and from the object, and generates first image data representing an ultrasound slice image along a slice plane substantially orthogonal to the projection plane, second image data representing the radiation image, and position data representing a position of the slice plane in the projection plane; a medical image storage apparatus that stores the first image data, the second image data, and the position data in association with each other; and a medical image display apparatus that displays the ultrasound slice image on the basis of the first image data and displays the radiation image in which a marker representing the position of the slice plane in the projection plane is represented, on the basis of the second image data and the position data.

JP2013-534432A has proposed a medical computer tomography apparatus including a support structure portion. More specifically, the support structure portion is designed to support a substantially annular structure supporting an X-ray imaging unit. The X-ray imaging unit is disposed within the substantially annular structure supporting the imaging unit and is movable within the substantially annular structure supporting the imaging unit. The substantially annular structure supporting the imaging unit includes an examination opening portion.

SUMMARY

In a mammography apparatus including a support portion that rotatably supports a radiation source and a display unit that acquires and displays each of a radiation image and an ultrasound image, in a case of acquiring the ultrasound image, it may be difficult to see the ultrasound image displayed on the display unit depending on a rotational position of the support portion, and thus there is room for improvement. In particular, in a case where the display unit is provided at a position to be rotated together with the radiation source, a display posture is changed by the rotation of the display unit.

The present disclosure is made in consideration of the circumstances, and an object thereof is to provide a mammography apparatus, a display method of the mammography apparatus, and a medical image acquisition system which can maintain visibility of an image displayed on a display unit even in a case where a support portion is rotated in the mammography apparatus including the support portion that rotatably supports a radiation source and the display unit that displays an ultrasound image.

In order to achieve the object, a mammography apparatus according to a first aspect of the present disclosure includes a support portion that rotatably supports a radiation source that emits radiation, at a plurality of imaging positions where incidence angles of the radiation to a breast of an examinee are different from each other; a display unit that is provided in the support portion, and displays an ultrasound image of the breast acquired by an ultrasound probe; and a mechanism that is provided between the display unit and the support portion, and rotates the display unit in conjunction with rotation of the support portion.

In a mammography apparatus according to a second aspect of the present disclosure, in the mammography apparatus according to the first aspect, the mechanism is a gimbal mechanism.

In a mammography apparatus according to a third aspect of the present disclosure, in the mammography apparatus according to the first aspect, the mechanism is a balancing mechanism.

In a mammography apparatus according to a fourth aspect of the present disclosure, in the mammography apparatus according to the third aspect, the balancing mechanism is a mechanism that includes a counterweight corresponding to weight of the display unit and supports the counterweight at a position opposite to the display unit with respect to a support point that supports the display unit, and the counterweight and the display unit are mechanisms rotatably supported at the support point.

In a mammography apparatus according to a fifth aspect of the present disclosure, in the mammography apparatus according to the first aspect, a rotation axis of the support portion and a rotation axis of the mechanism are parallel to each other.

In a mammography apparatus according to a sixth aspect of the present disclosure, in the mammography apparatus according to the first aspect, an interval between a rotation axis of the radiation source and a rotation axis of the mechanism is shorter than a farthest position of a detector that detects the radiation, from a rotation axis of the support portion.

In a mammography apparatus according to a seventh aspect according to the present disclosure, in the mammography apparatus according to the second aspect, the gimbal mechanism includes a detection unit that detects a rotation angle of the radiation source and a rotation driving unit that rotates the display unit, and the gimbal mechanism drives the rotation driving unit such that a display posture of the display unit becomes a predetermined display posture according to the rotation angle detected by the detection unit.

A display method of a mammography apparatus according to an eighth aspect of the present disclosure is a display method of a mammography apparatus including a support portion that rotatably supports a radiation source that emits radiation, at a plurality of imaging positions where incidence angles of the radiation to a breast of an examinee are different from each other, and a display unit that is provided in the support portion and displays an ultrasound image of the breast acquired by an ultrasound probe, in which a mechanism that maintains a display posture of the display unit even in a case where the support portion is rotated is provided between the display unit and the support portion, and the display method includes maintaining the display posture of the display unit using the mechanism even in a case where the support portion is rotated.

A medical image acquisition system according to a ninth aspect of the present disclosure includes an ultrasound apparatus including an ultrasound probe for acquiring an ultrasound image; and the mammography apparatus according to any one of the first to seventh aspects. According to the present disclosure, in a mammography apparatus including a support portion that rotatably supports a radiation source and a display unit that acquires and displays each of a radiation image and an ultrasound image, it is possible to maintain visibility of the image displayed on the display unit even in a case where the radiation source is rotated.

BRIEF DESCRIPTION OF THE DRAWINGS

Exemplary embodiments of the technology of the disclosure will be described in detail based on the following figures, wherein.

DETAILED DESCRIPTION

Hereinafter, embodiments of the present invention will be described in detail with reference to the drawings. Note that the present embodiment does not limit the present invention.

Figure 1:
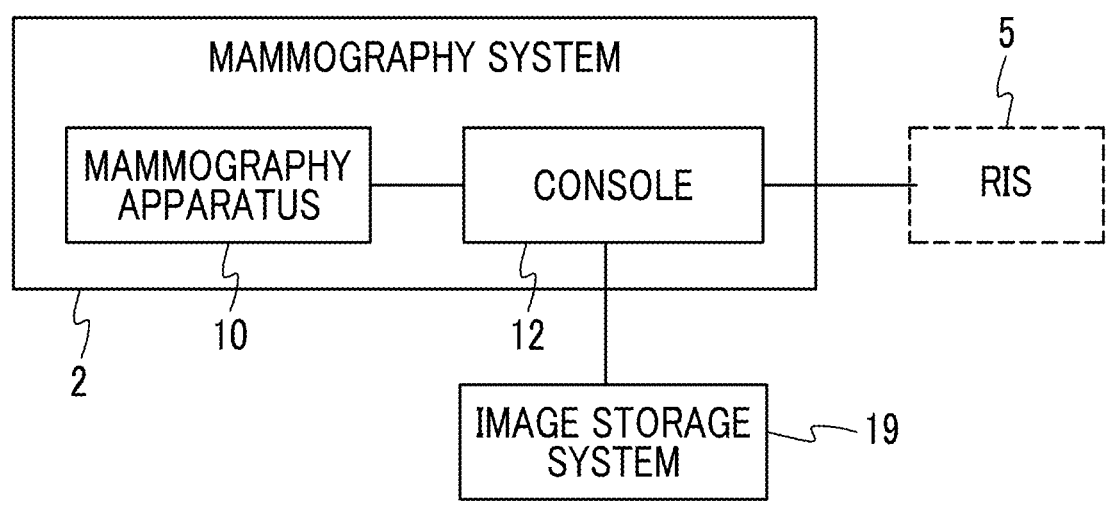
FIG. 1 is a configuration diagram schematically illustrating an example of an overall configuration of a medical image acquisition system of the present embodiment.

First, an example of the overall configuration of a medical image acquisition system 2 of the present embodiment will be schematically described. FIG. 1 illustrates a configuration diagram schematically illustrating an example of the overall configuration of the medical image acquisition system 2 of the present embodiment. As illustrated in FIG. 1, the medical image acquisition system 2 includes a mammography apparatus 10 and a console 12.

The mammography apparatus 10 is an apparatus capable of capturing a radiation image and an ultrasound image of a breast of an examinee and capable of performing a biopsy of the breast, using the breast of the examinee as a subject. For example, the mammography apparatus 10 of the present embodiment is an apparatus to which a function of performing ultrasonography is added to a mammography apparatus capable of performing a biopsy.

Figure 2:
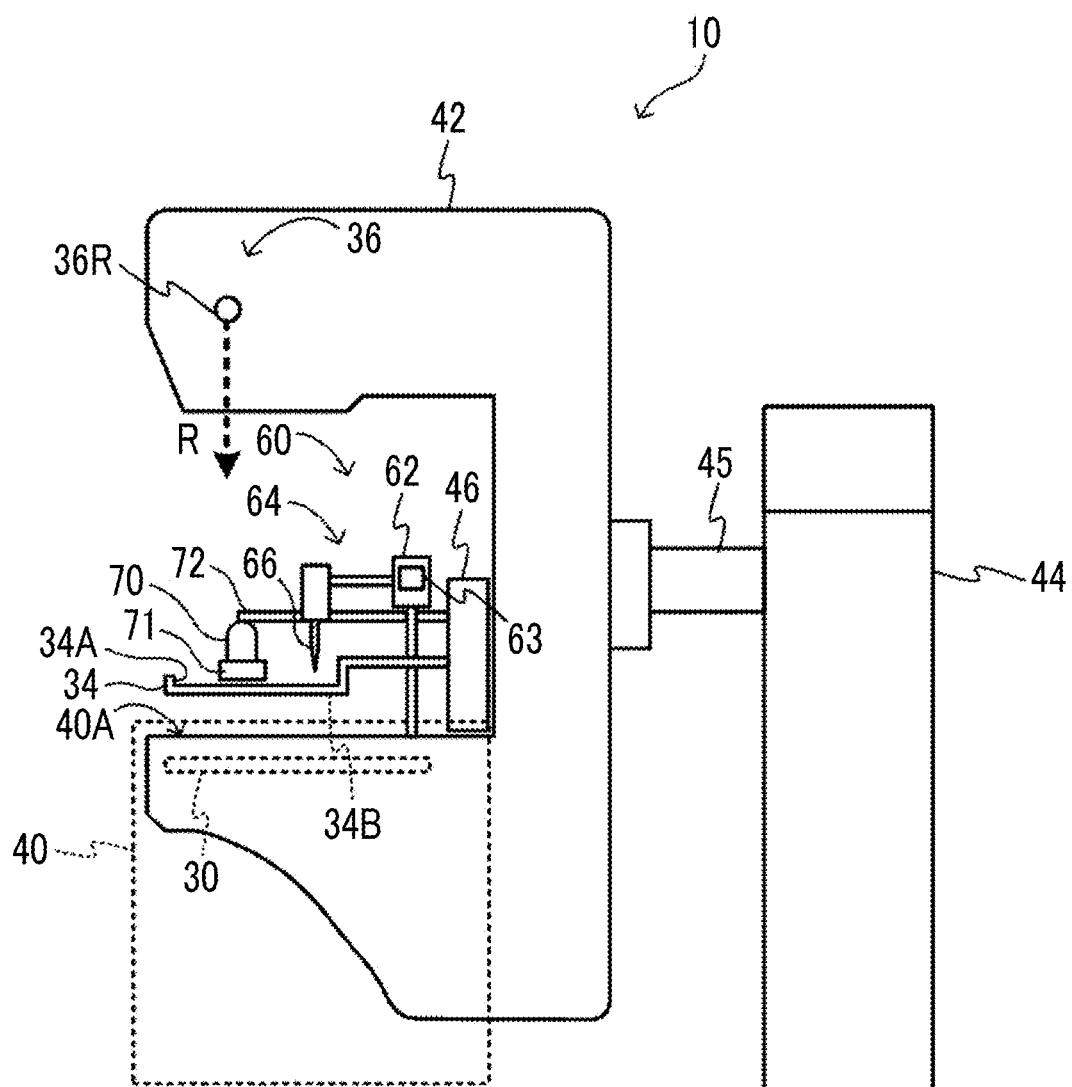
FIG. 2 is a side view illustrating an example of the appearance of a mammography apparatus of the present embodiment.

FIG. 2 is a side view illustrating an example of the appearance of the mammography apparatus 10 of the present embodiment. In addition, FIG. 2 is a side view illustrating the mammography apparatus 10 as viewed from the right side of an examinee. As illustrated in FIG. 2, the mammography apparatus 10 includes a radiation source 36R, a radiation detector 30, an imaging table 40 disposed between the radiation source 36R and the radiation detector 30, and a compression member 34 that compresses the breast between the compression member 34 and the imaging table 40.

The radiation detector 30 is disposed inside the imaging table 40. The radiation detector 30 detects radiation R transmitted through the breast as the subject. In the mammography apparatus 10 of the present embodiment, in a case where imaging is performed, the breast of the examinee is positioned on an imaging surface 40A of the imaging table 40 by an operator such as a doctor or a radiology technician. The imaging surface 40A or the like with which the breast of the examinee comes into contact is formed of carbon or the like in terms of the transmittance and intensity of the radiation R, for example.

The radiation detector 30 detects the radiation R transmitted through the breast of the examinee and the imaging table 40, generates a radiation image on the basis of the detected radiation R, and outputs the generated radiation image. The type of the radiation detector 30 of the present embodiment is not particularly limited, and for example, the radiation detector 30 may be an indirect conversion type radiation detector that converts the radiation R into light and converts the converted light into electric charges, or may be a direct conversion type radiation detector that directly converts the radiation R into electric charges.

The radiation source 36R is provided in a radiation emitting unit 36. As illustrated in FIG. 2, the radiation emitting unit 36 is provided in an arm part 42 as an example of a support portion (bracket), together with the imaging table 40 and a compression unit 46. Note that, as illustrated in FIG. 2, the mammography apparatus 10 of the present embodiment includes the arm part 42, a base 44 as an example of a support table, and a shaft portion 45. The arm part 42 is held by the base 44 to be movable in an up-down direction (Z-axis direction). The shaft portion 45 connects the arm part 42 to the base 44. In addition, the arm part 42 rotatably supports the radiation source 36R at a plurality of imaging positions where incidence angles of the radiation to the breast of the examinee are different from each other. Specifically, the arm part 42 is rotatable relative to the base 44 by a radiation source moving unit 37 (refer to FIG. 5) with the shaft portion 45 as a rotation axis. By rotating the arm part 42 relative to the base 44, the incidence angle of the radiation to the breast placed on the imaging surface 40A of the imaging table 40 can be varied. As described above, the mammography apparatus 10 according to the present embodiment can perform so-called stereo imaging or tomosynthesis imaging. Note that the radiation source moving unit 37 functions as an example of a detection unit (detector), and has a function of detecting the rotational position of the arm part 42. For example, a sensor that detects the rotational position of the arm part 42 may be included, or the rotational position may be detected by detecting a drive amount of the radiation source moving unit 37.

In addition, as illustrated in FIG. 2, the compression member 34 is attached to the compression unit 46. The compression unit 46 and the arm part 42 can be relatively rotated with respect to the base 44 separately, using the shaft portion 45 as the rotation axis. In the present embodiment, gears (not illustrated) are provided in each of the shaft portion 45, the arm part 42, and the compression unit 46. Each gear is switched between an engaged state and a disengaged state to connect each of the arm part 42 and the compression unit 46 to the shaft portion 45. One or both of the arm part 42 and the compression unit 46 connected to the shaft portion 45 are rotated integrally with the shaft portion 45.

The compression member 34 of the present embodiment is a plate-shaped member, and is moved in the up-down direction (Z-axis direction) by a compression member driving unit 32 (refer to FIG. 5) provided in the compression unit 46 to compress the breast of the examinee between the compression member 34 and the imaging table 40.

Figure 3:
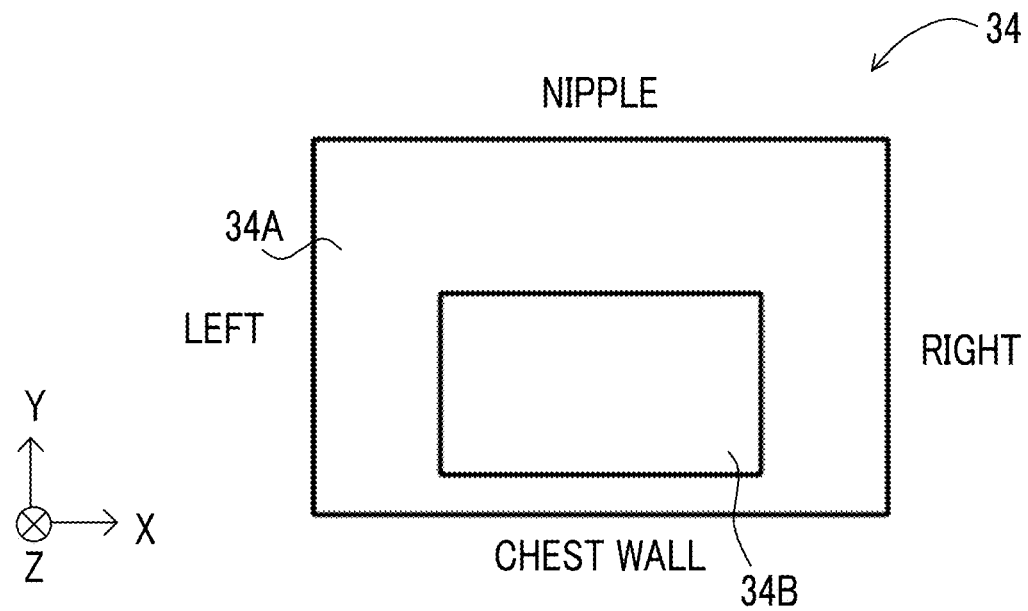
FIG. 3 is a diagram illustrating an example of a compression member of the present embodiment.

It is preferable that the compression member 34 is optically transparent in order to check positioning or a compression state in the compression of the breast. In addition, the compression member 34 is formed of a material having excellent transmittance of the radiation R. Furthermore, the compression member 34 of the present embodiment is a compression member for a biopsy, and as illustrated in FIG. 3, the compression member 34 has an opening portion 34B at a bottom portion 34A that is in contact with the breast in a case of compressing the breast. A biopsy needle 66 and an ultrasound probe 70 can be inserted into the opening portion 34B.

In addition, as illustrated in FIG. 2, the mammography apparatus 10 according to the present embodiment includes a biopsy unit 60. The biopsy unit 60 includes an arrangement mechanism 62, the biopsy needle 66, and a biopsy needle unit 64. The biopsy needle 66 is provided in the biopsy needle unit 64, and is used to puncture the breast and collect tissues. The arrangement mechanism 62 has a function of moving the biopsy needle 66 in X, Y, and Z directions to arrange the biopsy needle 66 at a target insertion position. Note that, in the present embodiment, the X direction is a left-right direction of the examinee, and the Y direction is a front-rear direction of the examinee. In addition, the Z direction is a direction perpendicular to the XY plane, and is the up-down direction of the examinee. Therefore, hereinafter, the X direction is referred to as the "left-right direction", the Y direction is referred to as the "front-rear direction", and the Z direction is referred to as the "up-down direction".

The arrangement mechanism 62 includes a needle position controller 63, and a position of a distal end of the biopsy needle 66 is controlled by the needle position controller 63. In a case where position information of a target is received, the needle position controller 63 moves the position of the distal end of the biopsy needle 66 to a target insertion position corresponding to the position of the target, and inclines the biopsy needle 66 according to a target insertion angle. The biopsy needle 66 thus disposed by the arrangement mechanism 62 is made to puncture a breast W, and the target is collected using the biopsy needle 66, that is, a biopsy is performed.

In addition, as illustrated in FIG. 2, the mammography apparatus 10 of the present embodiment includes the ultrasound probe 70 to which an acoustic matching body 71 is attached, and a moving mechanism 72.

The ultrasound probe 70 is used for acquiring an ultrasound image of the breast by scanning the breast with ultrasound waves. The ultrasound probe 70 includes a plurality of ultrasound transducers (not illustrated) which are one-dimensionally or two-dimensionally arranged. Each of the ultrasound transducers transmits ultrasound waves on the basis of an applied drive signal, receives ultrasound echoes, and outputs a reception signal. The acoustic matching body 71 is provided in the ultrasound probe 70 to cover at least a transmission surface for the ultrasound waves, which comes into contact with the breast. The acoustic matching body 71 is formed of a member having an acoustic impedance close to that of a living body (breast), and is in the form of a gel or a sheet in the present embodiment. As such an acoustic matching body 71, an acoustic coupler or the like can be used. Specific examples thereof include an acoustic coupler of a type in which a polyurethane gel pad is fixed to the ultrasound probe 70 with a fixing jig.

Figure 4:
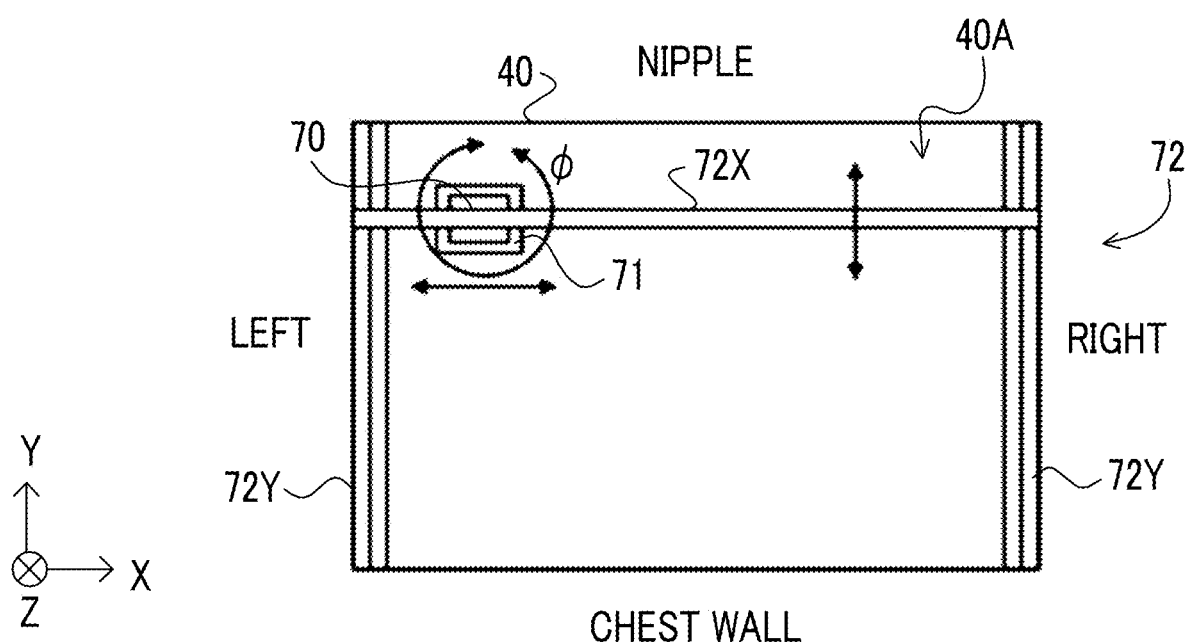
FIG. 4 is a diagram illustrating an example of a moving mechanism of an ultrasound probe of the present embodiment.

The moving mechanism 72 has a function of moving the ultrasound probe 70 in the front-rear, left-right, and up-down directions. As illustrated in FIG. 4, the moving mechanism 72 includes one moving rail 72X and two moving rails 72Y. The moving rail 72X is a rail extending in the left-right direction, and the ultrasound probe 70 is attached to the moving rail 72X. The moving mechanism 72 changes the position of the ultrasound probe 70 along the left-right direction by moving the ultrasound probe 70 along the moving rail 72X.

In addition, the moving rail 72Y is a rail provided at each of both ends of the imaging surface 40A of the imaging table 40 and extending along the front-rear direction. The moving mechanism 72 changes the position of the ultrasound probe 70 along the front-rear direction by moving the moving rail 72X to which the ultrasound probe 70 is attached, along the front-rear direction.

In addition, the moving mechanism 72 can also change the height of the ultrasound probe 70 by moving the moving rails 72X and 72Y in the up-down direction.

Furthermore, in the present embodiment, as illustrated in FIG. 4, the moving mechanism 72 can change the breast contact orientation by rotating the ultrasound probe 70 (rotation angle φ).

On the other hand, the console 12 of the present embodiment has a function of controlling the mammography apparatus 10 using an imaging order and various kinds of information acquired from a radiology information system (RIS) 5 or the like via a wireless communication local area network (LAN), instructions input by a user using an operation unit 56 (refer to FIG. 5) or the like, and the like. In addition, the console 12 is also connected to an image storage system 19 through wireless communication or wired communication, and has a function of transmitting radiation images and ultrasound images obtained by the mammography apparatus 10 to the image storage system 19 such as picture archiving and communication systems (PACS) and storing the images.

Figure 5:
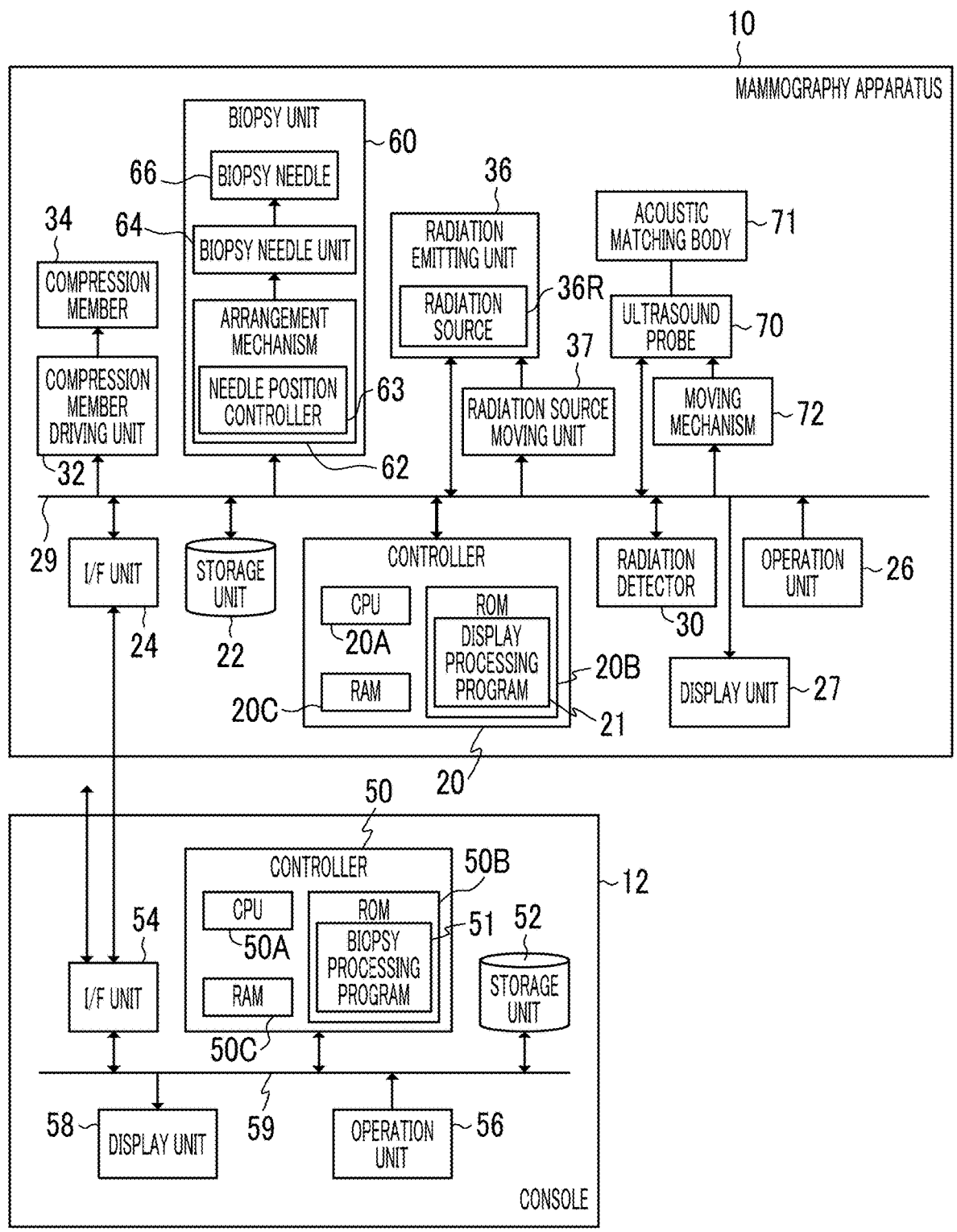
FIG. 5 is a block diagram illustrating an example of configurations of the mammography apparatus and a console of the present embodiment.

Furthermore, configurations of the mammography apparatus 10 and the console 12 will be described with reference to FIG. 5. FIG. 5 illustrates a block diagram illustrating an example of the configurations of the mammography apparatus 10 and the console 12.

As illustrated in FIG. 5, the mammography apparatus 10 further includes a controller 20, a storage unit 22, an I/F unit 24, an operation unit 26, and a display unit (display) 27. The controller 20, the storage unit 22, the I/F unit 24, the operation unit 26, the display unit 27, the radiation detector 30, the compression member driving unit 32, the radiation emitting unit 36, the radiation source moving unit 37, the biopsy unit 60, the ultrasound probe 70, and the moving mechanism 72 are connected to each other to be able to transmit and receive various kinds of information, via a bus 29 such as a system bus or a control bus.

The controller 20 of the present embodiment controls the overall operation of the mammography apparatus 10. The controller 20 comprises a CPU 20A, a ROM 20B, and a RAM 20C. Various programs and the like executed by the CPU 20A, such as an imaging processing program and a display processing program 21 executed in the case of controlling imaging, are stored in advance in the ROM 20B. The RAM 20C temporarily stores various kinds of data.

The storage unit 22 stores radiation images captured using the radiation detector 30, ultrasound images captured using the ultrasound probe 70, various other kinds of information, and the like. Specific examples of the storage unit 22 include an HDD, an SSD, and the like.

The operation unit 26 is used by the user to input instructions, various kinds of information, and the like regarding the imaging and biopsy. Note that the operation unit 26 is not particularly limited, and examples of the operation unit 26 include various switches, a touch panel, a touch pen, a mouse, and the like.

Figure 6:
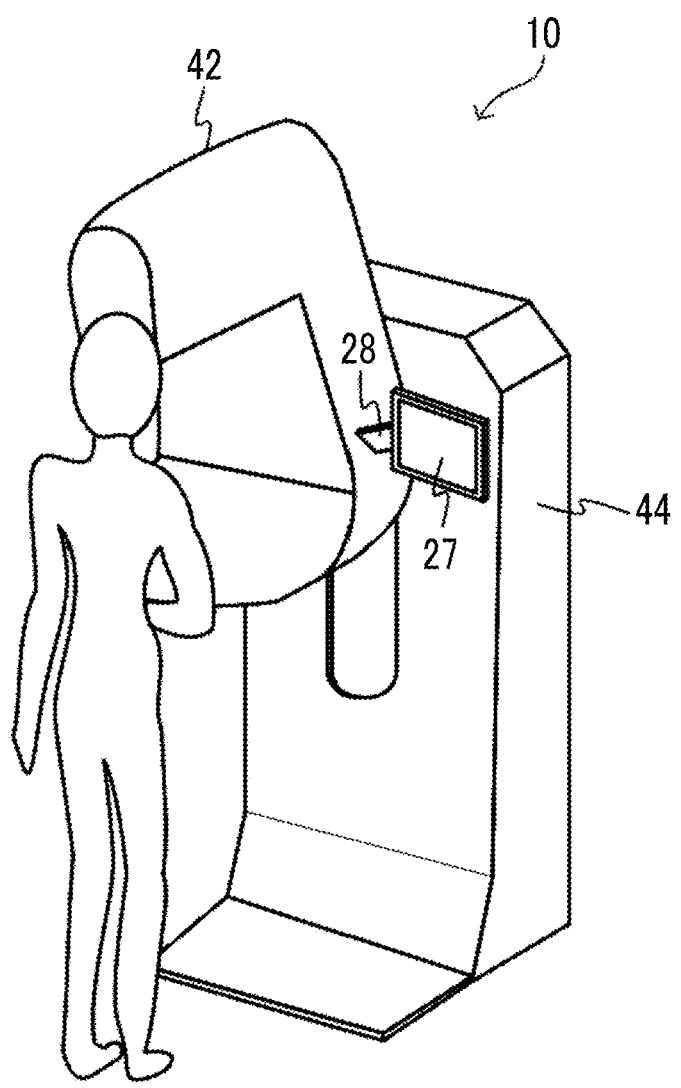
FIG. 6 is a diagram illustrating a state in which an angle of an arm part of the mammography apparatus of the present embodiment is 0 degrees.

The display unit 27 displays an ultrasound image of the breast of the examinee acquired by the ultrasound probe. In the present embodiment, as illustrated in FIG. 6, the display unit 27 is provided on the side surface of the arm part 42. In the present embodiment, the display unit 27 is provided on the side surface of the arm part 42 via a mechanism 28 that rotates the display unit 27 in conjunction with the rotation of the arm part 42. Note that the display unit 27 may also display other images such as radiation images other than the ultrasound images. In addition, the display unit 27 may be provided on one side surface of the arm part 42 or on both side surfaces of the arm part 42. In addition, as an example, a direct-viewing type electronic display is applied to the display unit 27.

The I/F unit 24 performs communication of radiation images, ultrasound images, and various kinds of information with the console 12 via wireless communication or wired communication.

On the other hand, as illustrated in FIG. 5, the console 12 includes a controller 50, a storage unit 52, an I/F unit 54, the operation unit 56, and a display unit 58. The controller 50, the storage unit 52, the I/F unit 54, the operation unit 56, and the display unit 58 are connected to each other to be able to transmit and receive various kinds of information, via a bus 59 such as a system bus or a control bus.

The controller 50 of the present embodiment controls the overall operation of the console 12. The controller 50 includes a CPU 50A, a ROM 50B, and a RAM 50C. Various programs and the like executed by the CPU 50A, such as a biopsy processing program 51 executed in the case of controlling a biopsy, are stored in the ROM 50B in advance. The RAM 50C transitorily stores various kinds of data.

The storage unit 52 stores radiation images and ultrasound images captured using the mammography apparatus 10, various other kinds of information, and the like. Specific examples of the storage unit 52 include an HDD, an SSD, and the like.

The operation unit 56 is used by the user to input instructions, various kinds of information, and the like regarding the imaging and biopsy. Note that the operation unit 56 is not particularly limited, and examples of the operation unit 56 include various switches, a touch panel, a touch pen, a mouse, and the like. The display unit 58 displays various kinds of information. Note that the operation unit 56 and the display unit 58 may be integrated into a touch panel display.

The I/F unit 54 performs communication of radiation images, ultrasound images, and various kinds of information with each of the RIS 5, the mammography apparatus 10, and the image storage system 19 via wireless communication or wired communication.

Meanwhile, in the mammography apparatus 10 configured as described above, in a case of checking the ultrasound image while checking the position of the ultrasound probe 70, in a case where the arm part 42 is rotated, the ultrasound image may be difficult to see depending on the position of the display unit 27 that displays the ultrasound image.

In addition, in order to make the ultrasound image easier to see, it is considered to provide the display unit 27 on the arm part 42, but, in a case where the display unit 27 is provided on the arm part 42, the posture of the display unit 27 is changed by the rotation of the arm part 42. Therefore, the image displayed on the display unit 27 is also rotated and the ultrasound image becomes difficult to see.

Therefore, in the mammography apparatus 10 according to the present embodiment, as illustrated in FIG. 6, the display unit 27 is provided on the side surface of the arm part 42. Then, the mechanism 28 that rotates the display unit 27 in conjunction with the rotation of the arm part 42 is provided between the display unit 27 and the arm part 42.

Figure 7:
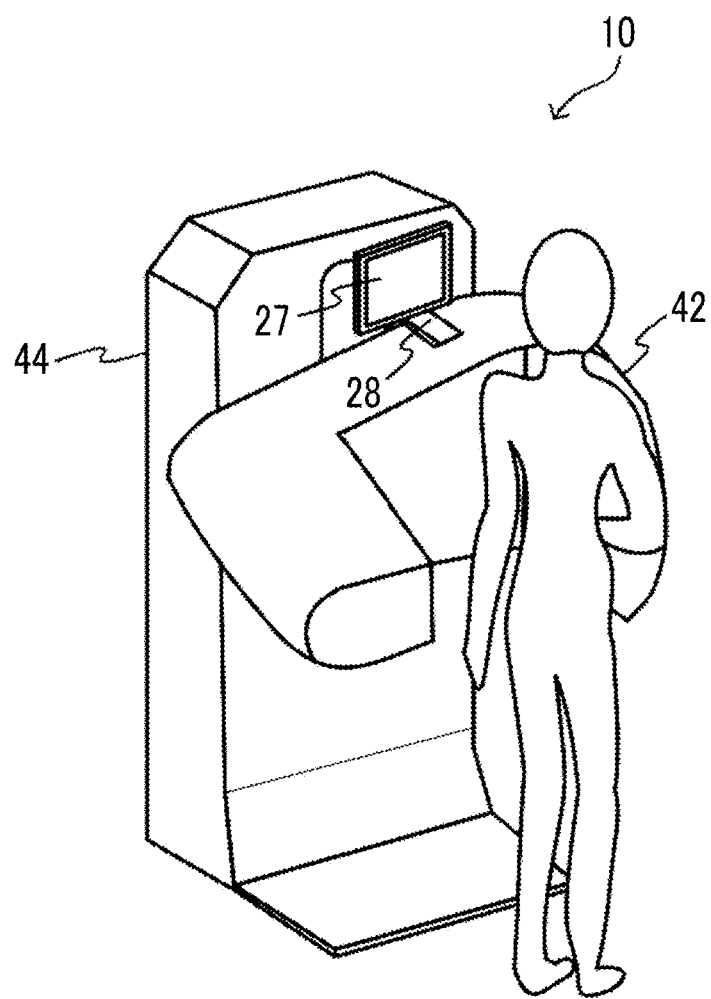
FIG. 7 is a diagram illustrating a state in which an angle of the arm part of the mammography apparatus of the present embodiment is 90 degrees.

Accordingly, as illustrated in FIGS. 6 and 7, since the display unit 27 is rotated by the mechanism 28 in conjunction with the rotation of the arm part 42, the posture of the display unit 27 can be maintained before and after the rotation of the arm part 42. Note that FIG. 6 is a diagram illustrating a state where the angle of the arm part of the mammography apparatus 10 is 0 degrees, and FIG. 7 is a diagram illustrating a state where the angle of the arm part of the mammography apparatus 10 is 90 degrees.

First Embodiment

Figure 8:
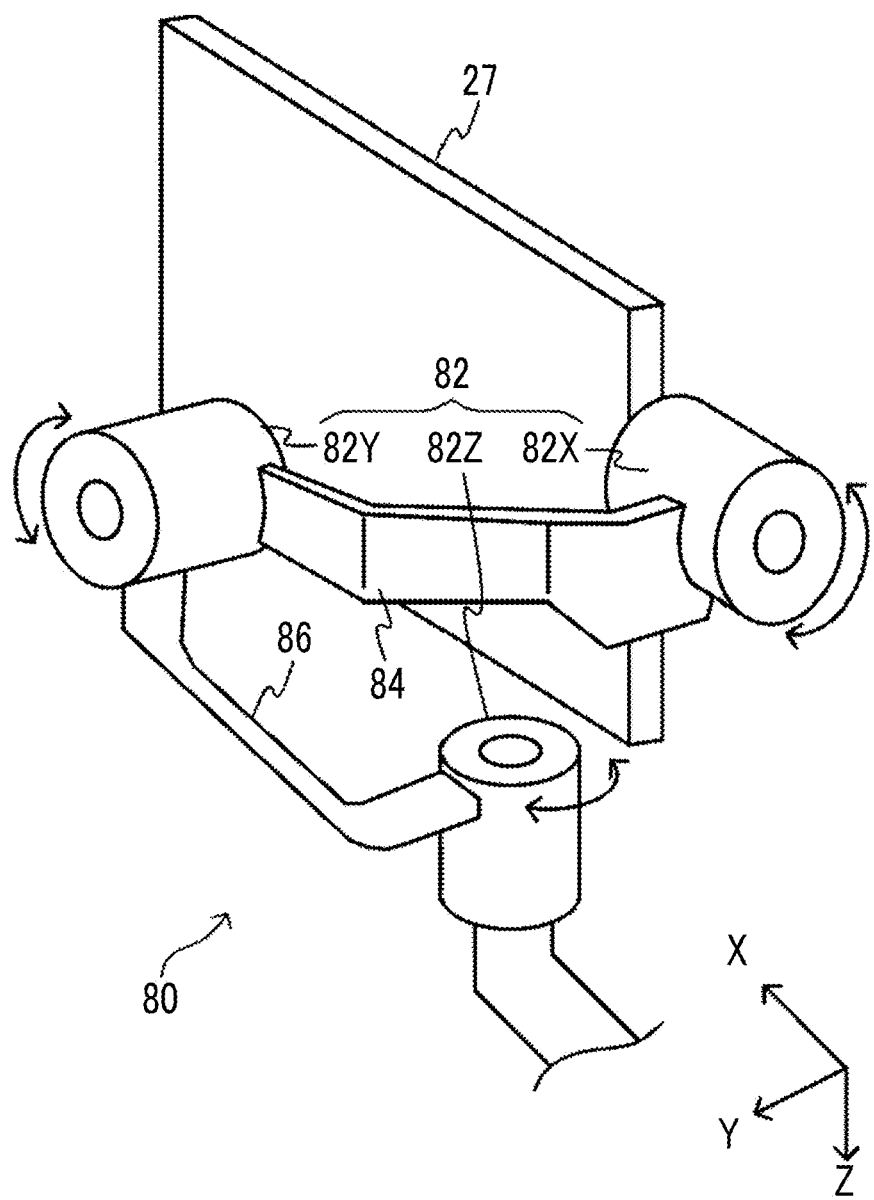
FIG. 8 is a diagram illustrating an example in which a 3-axis gimbal mechanism is applied as a mechanism that rotates a display unit in conjunction with the rotation of the arm part.

Here, as the first embodiment, a specific configuration example of the mechanism 28 that rotates the display unit 27 in conjunction with the rotation of the arm part 42 will be described. In the present embodiment, an example in which a 3-axis gimbal mechanism is applied as the mechanism 28 that rotates the display unit 27 in conjunction with the rotation of the arm part 42 will be described. FIG. 8 is a diagram illustrating an example in which the 3-axis gimbal mechanism is applied as the mechanism 28 that rotates the display unit 27 in conjunction with the rotation of the arm part 42.

A gimbal mechanism 80 illustrated in FIG. 8 includes, for example, a rotation driving unit (rotation mechanism) 82 including a driving unit such as a bearing or a motor. In the example in FIG. 8, there are provided three rotation driving units 82 of a rotation driving unit 82X having an X axis as a rotation axis, a rotation driving unit 82Y having a Y axis as a rotation axis, and a rotation driving unit 82Z having a Z axis as a rotation axis.

The rotation driving unit 82X and the rotation driving unit 82Y are connected by a first arm 84, and the rotation driving unit 82Y and the rotation driving unit 82Z are connected by a second arm 86. Note that each of the first arm 84 and the second arm 86 has a shape and a length such that each arm does not interfere with each rotation driving unit 82 or the display unit 27 even in a case where each rotation driving unit 82 is rotated. For example, the first arm 84 has a shape and a length such that the first arm 84 does not interfere with the rotation driving unit 82Z even in a case where the first arm 84 is rotated by the rotation driving unit 82Y. In addition, the second arm 86 has a shape and a length such that the display unit 27 does not interfere with the rotation driving unit 82Z even in a case where the display unit 27 is rotated by the rotation driving unit 82X.

Each rotation driving unit 82 is driven by the control of the controller 20, and is operated in conjunction with the rotation of the arm part 42 such that the posture of the display unit 27 is in a predetermined posture. For example, the rotational position of each rotation driving unit 82 is stored in advance in accordance with the rotational position of the arm part 42, and the controller 20 controls to maintain the display unit 27 in a predetermined posture even in a case where the arm part 42 is rotated, by controlling each rotation driving unit 82 in accordance with the rotational position of the arm part 42.

Note that the posture of the display unit 27 may be set in advance, and the controller 20 may control each rotation driving unit 82 such that the posture of the display unit 27 is maintained in the set posture. Accordingly, for example, by setting the angle of the display unit 27 in an X-axis direction to an angle that is easy to see, it is possible to maintain the set posture of the display unit 27 even in a case where the arm part 42 is rotated.

Figure 9:
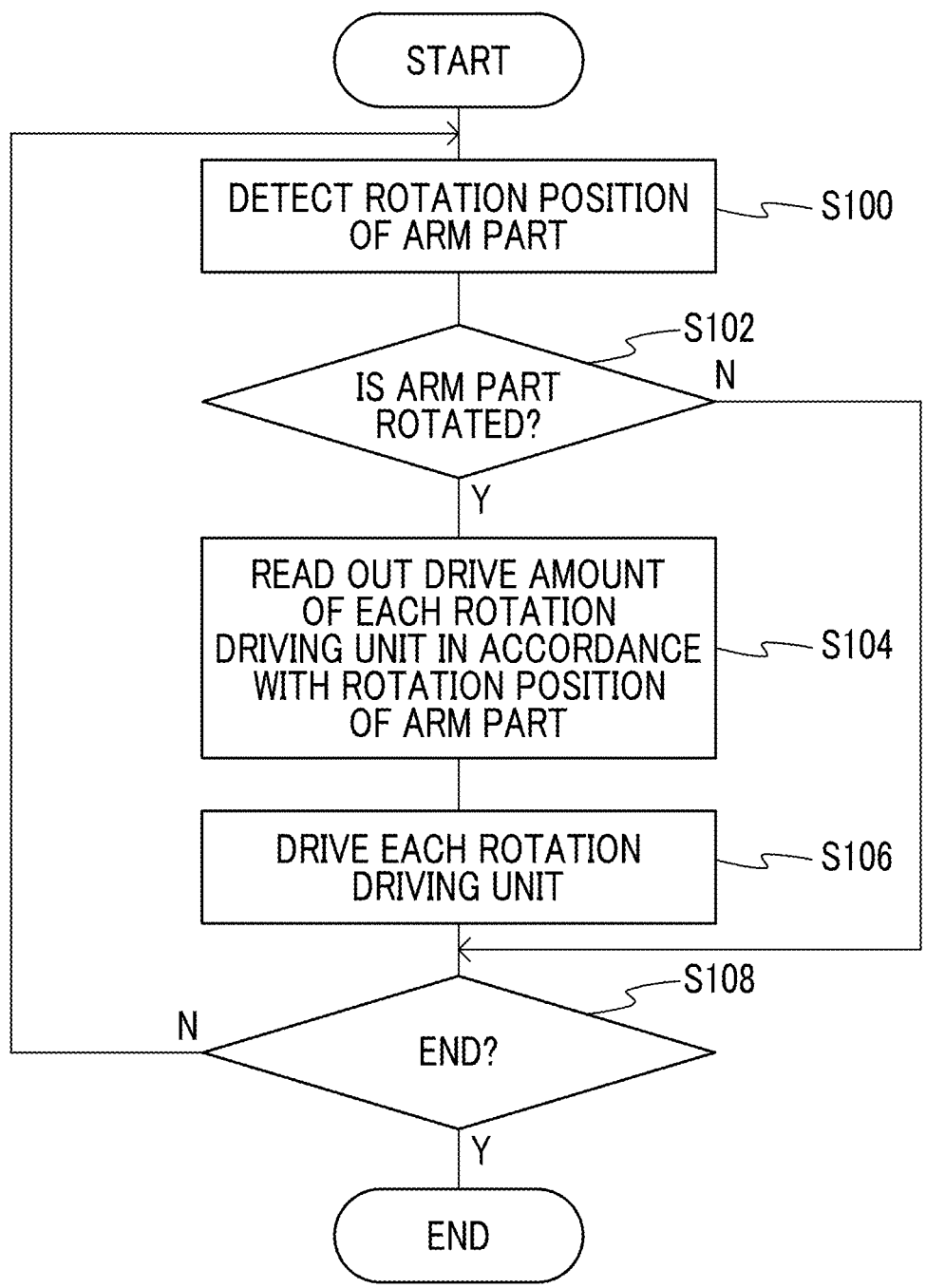
FIG. 9 is a flowchart illustrating an example of a flow of processing performed by a controller of a mammography apparatus according to a first embodiment.

Subsequently, specific processing performed by the controller 20 of the mammography apparatus 10 according to the present embodiment configured as described above will be described. FIG. 9 is a flowchart illustrating an example of a flow of processing performed by the controller 20 of the mammography apparatus 10 according to the present embodiment. Note that the processing in FIG. 9 is performed by the CPU 20A executing the display processing program 21, and is started, for example, in a case where the imaging of the ultrasound image is instructed.

In step S100, the CPU 20A detects the rotational position of the arm part 42, and the processing transitions to step S102. For example, the rotational position of the arm part 42 is detected by a function of the radiation source moving unit 37 which detects the rotational position of the arm part 42.

In step S102, the CPU 20A determines whether or not the arm part 42 is rotated. In a case where the determination result is affirmative, the processing transitions to step S104, and in a case where the determination result is negative, the processing transitions to step S108, which will be described later.

In step S104, the CPU 20A reads out the drive amount of each rotation driving unit 82 in accordance with the rotational position of the arm part 42, and the processing transitions to step S106.

In step S106, the CPU 20A drives each rotation driving unit 82, and the processing transitions to step S108. Accordingly, since the display unit 27 is rotated by the rotation driving unit 82 in conjunction with the rotation of the arm part 42, the posture of the display unit 27 can be maintained before and after the rotation of the arm part 42.

In step S108, the CPU 20A determines whether to end the processing. For example, the determination is made as to whether or not ending the imaging by the mammography apparatus 10 or the imaging of the ultrasound image is instructed. In a case where the determination result is negative, the processing returns to step S100 and repeats the processing described above, and in a case where the determination result is affirmative, the series of processing is ended.

In this manner, in the present embodiment, the posture of the display unit 27 can be maintained even in a case where the arm part 42 is rotated, by rotating the display unit 27 in conjunction with the rotation of the arm part 42 using the 3-axis gimbal mechanism. Accordingly, the visibility of the ultrasound image displayed on the display unit 27 can be maintained even in a case where the arm part 42 is rotated.

In addition, since the posture of the display unit 27 is maintained even in a case where the arm part 42 is rotated, the ultrasound probe can be used without impairing the operational feel.

Second Embodiment

Figure 10:
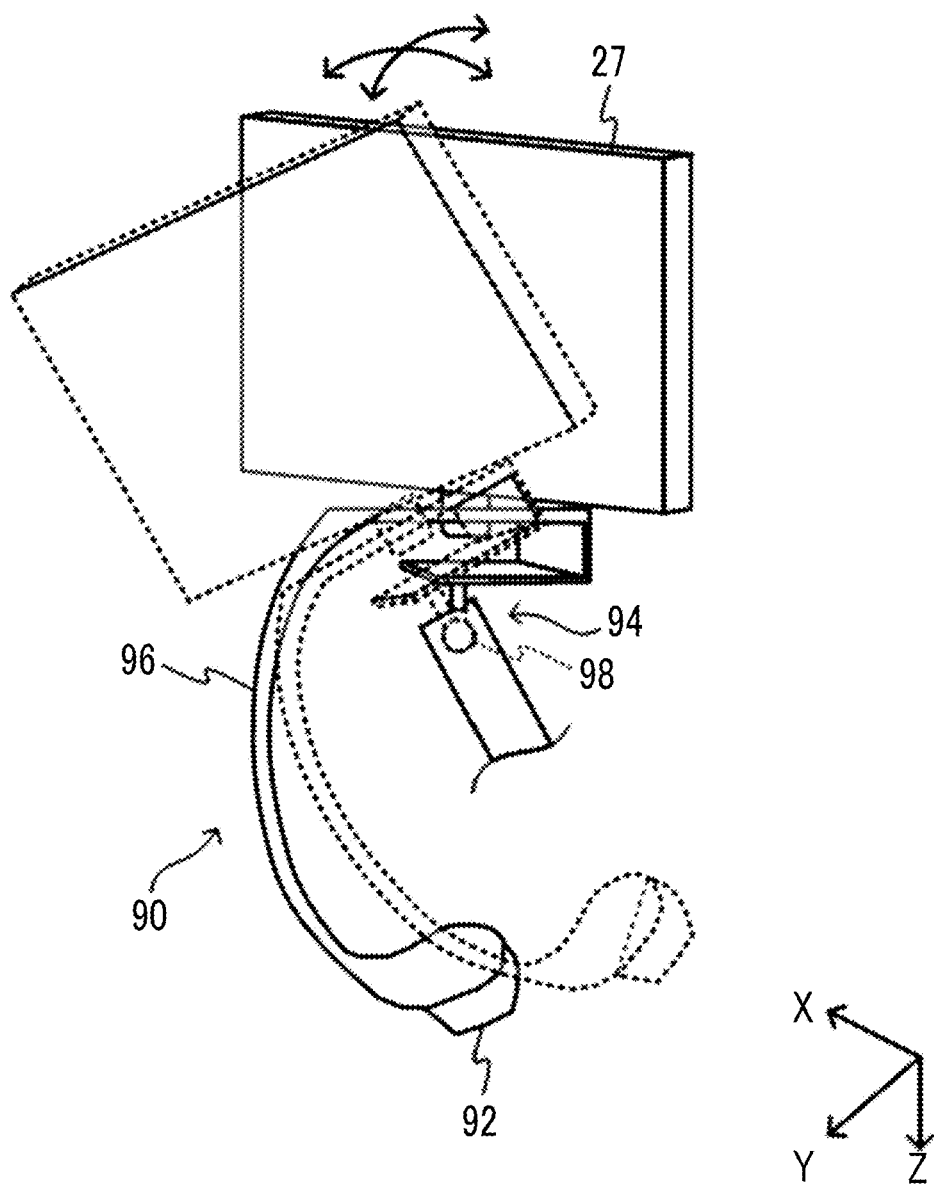
FIG. 10 is a diagram illustrating an example in which a balancing mechanism is applied as a mechanism that rotates the display unit in conjunction with the rotation of the arm part.

Subsequently, as a second embodiment, another example of the mechanism 28 that rotates the display unit 27 in conjunction with the rotation of the arm part 42 will be described. In the present embodiment, as another example of the mechanism 28 that rotates the display unit 27 in conjunction with the rotation of the arm part 42, an example in which a balancing mechanism is applied will be described. FIG. 10 is a diagram illustrating an example in which a balancing mechanism is applied as the mechanism 28 that rotates the display unit 27 in conjunction with the rotation of the arm part 42.

In the present embodiment, a balancing mechanism 90 is a mechanism that includes a counterweight 92 corresponding to the weight of the display unit 27 and supports the counterweight 92 at a position opposite to the display unit 27 with respect to a support point 94 that supports the display unit 27. The counterweight 92 and the display unit 27 are mechanisms rotatably supported at the support point 94.

Specifically, the balancing mechanism 90 illustrated in FIG. 10 includes a bracket 96 that is provided with the counterweight 92 at one end and the display unit 27 at the other end, and the support point 94 is provided on the bracket 96.

In addition, a ball joint 98 is provided at the support point 94. The display unit 27 is rotated in each of the front-rear direction and the left-right direction (arrow directions illustrated in FIG. 10) by the ball joint 98, and the rotation is stopped at a position where the counterweight 92 and the display unit 27 are balanced.

That is, in the second embodiment, the posture of the display unit 27 is mechanically maintained at the predetermined posture as in the gimbal mechanism 80.

Next, the operation of the mammography apparatus 10 including the balancing mechanism 90 configured as described above will be described.

In a case where the arm part 42 is rotated as illustrated in FIG. 7 from the angle of 0 degrees of the arm part 42 as illustrated in FIG. 6, for example, the display unit 27 is also rotated initially as indicated by a dotted line in conjunction with the rotation of the arm part 42 from a state indicated by a solid line in FIG. 10. However, the display unit 27 returns to the original posture, using the ball joint 98 as a fulcrum, to maintain the posture indicated by the solid line, by the counterweight 92 of the balancing mechanism 90.

Therefore, since the display unit 27 is rotated in conjunction with the rotation of the arm part 42, even in a case where the arm part 42 is rotated, the posture of the ultrasound image displayed on the display unit 27 can be maintained as in the first embodiment.

In addition, since the posture of the display unit 27 is maintained even in a case where the arm part 42 is rotated, the ultrasound probe can be used without impairing the operational feel.

Third Embodiment

Figure 11:
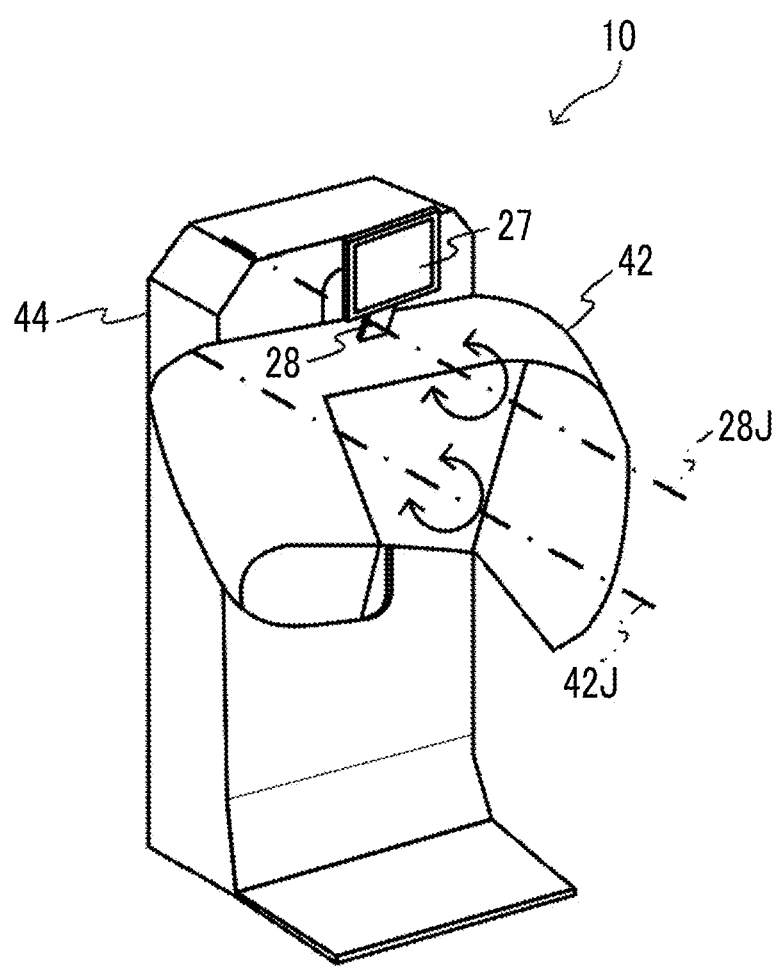
FIG. 11 is a diagram illustrating a mammography apparatus according to a third embodiment.

Subsequently, a mammography apparatus according to a third embodiment will be described. FIG. 11 is a diagram illustrating the mammography apparatus according to the third embodiment.

In the present embodiment, as illustrated in FIG. 11, a rotation axis 42J of the arm part 42 of the mammography apparatus 10 and a rotation axis 28J of the mechanism 28 that rotates the display unit 27 in conjunction with the rotation of the arm part 42 are parallel to each other.

Here, the term "parallel" means, in addition to being perfectly parallel, including errors that are generally acceptable in the technical field to which the technology of the present disclosure belongs, for example, inclinations that are acceptable in design without being necessarily strictly parallel.

In the present embodiment, as the mechanism 28 that rotates the display unit 27 in conjunction with the rotation of the arm part 42, the gimbal mechanism 80 of the first embodiment may be applied, or the balancing mechanism 90 of the second embodiment may be applied. That is, the rotation axis 28J and the rotation axis 42J are set to be parallel to each other in the first embodiment or the second embodiment.

In a case where the gimbal mechanism 80 of the first embodiment is applied, the two rotation axes 28J and 42J are made parallel to each other, and thus a single-axis gimbal mechanism 80 can be used. By making the two rotation axes 28J and 42J parallel to each other, even in a case where the arm part 42 is rotated, the display unit 27 is rotated in the rotation direction of the rotation axis 28J. Therefore, the posture of the display unit 27 can be maintained by the simple gimbal mechanism 80 before and after the rotation of the arm part 42.

In addition, similarly, in a case where the balancing mechanism 90 of the second embodiment is applied, the balance mechanism that moves rotationally only in the direction of the rotation axis 28J can be used. Furthermore, even in a case where the arm part 42 is rotated, by rotating the display unit 27 in the rotation direction of the rotation axis 28J, the posture of the display unit 27 can be maintained by the simple balancing mechanism 90 before and after the rotation of the arm part 42.

Fourth Embodiment

Figure 12:
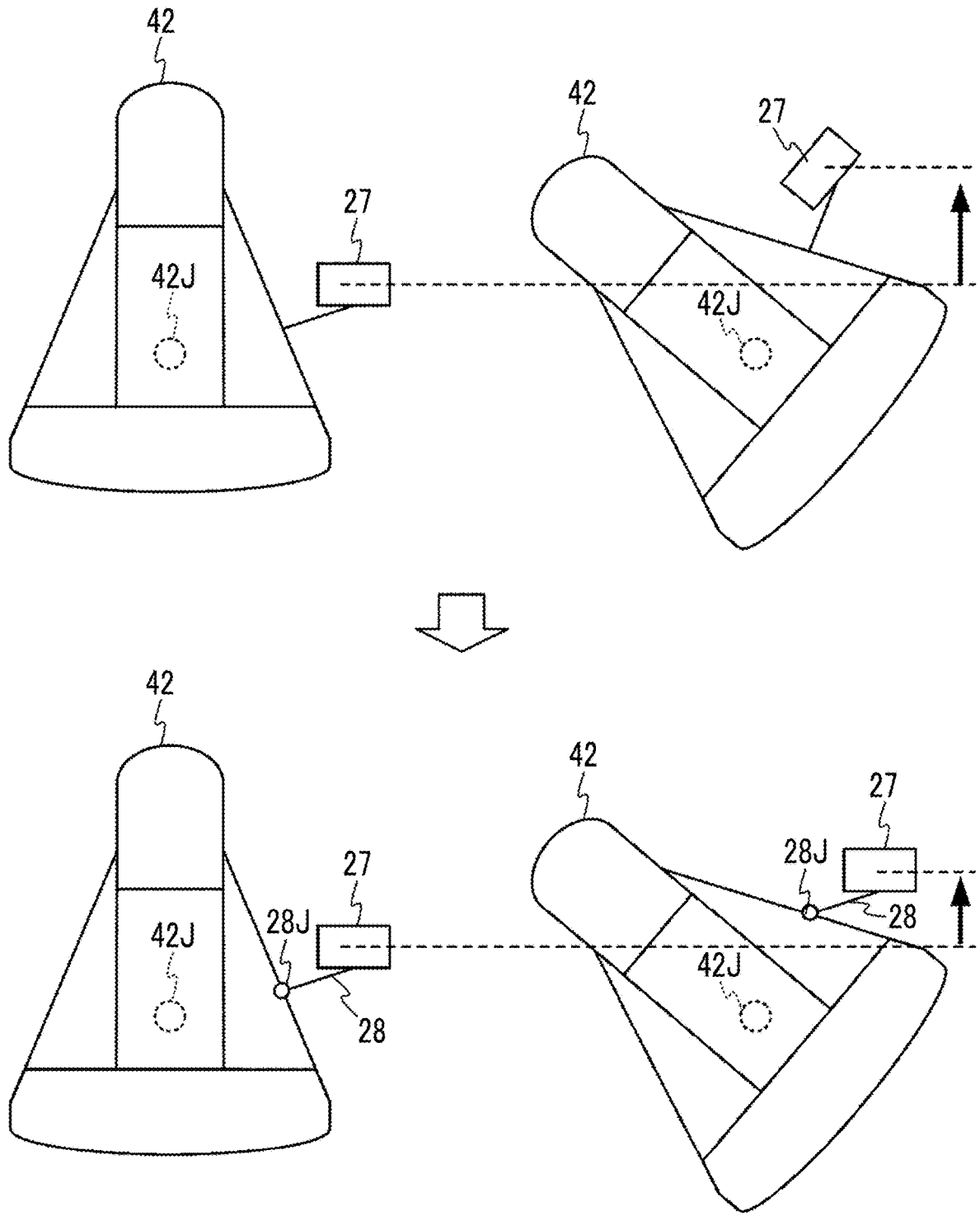
FIG. 12 is a diagram illustrating a mammography apparatus according to a fourth embodiment.

Subsequently, a mammography apparatus according to a fourth embodiment will be described. FIG. 12 is a diagram illustrating the mammography apparatus according to the fourth embodiment.

In the present embodiment, the interval between the rotation axis 42J of the arm part 42 of the mammography apparatus 10 and the rotation axis 28J of the mechanism 28 that rotates the display unit 27 in conjunction with the rotation of the arm part 42 is set to be shorter than the farthest position of the radiation detector 30 from the rotation axis 42J of the arm part 42. In other words, the rotation axis 28J of the mechanism 28 is set near the rotation axis 42J of the arm part 42.

In a case where there is no mechanism 28 that rotates the display unit 27 in conjunction with the rotation of the arm part 42, the display unit 27 is not rotated in conjunction with the rotation of the arm part 42, and therefore, the posture of the display unit 27 is changed before and after the rotation of the arm part 42, as illustrated on the upper side of FIG. 12.

In contrast, in the mammography apparatus 10 according to the present embodiment, as illustrated on the lower side of FIG. 12, since the display unit 27 is rotated by the mechanism 28 in conjunction with the rotation of the arm part 42, the posture of the display unit 27 can be maintained before and after the rotation of the arm part 42. In addition, the movement of the display unit 27 in the Z direction is also suppressed.

Furthermore, in the present embodiment, by making the interval between the rotation axis 42J and the rotation axis 28J shorter than the farthest position from the rotation axis 42J, the movement of the display unit 27 before and after the rotation of the arm part 42 can be suppressed not only in the Z direction but also in the X direction. Accordingly, since the change in the visual line of the operator before and after the rotation of the arm part 42 is minimized, the display unit 27 becomes easier to see.

Figure 13:
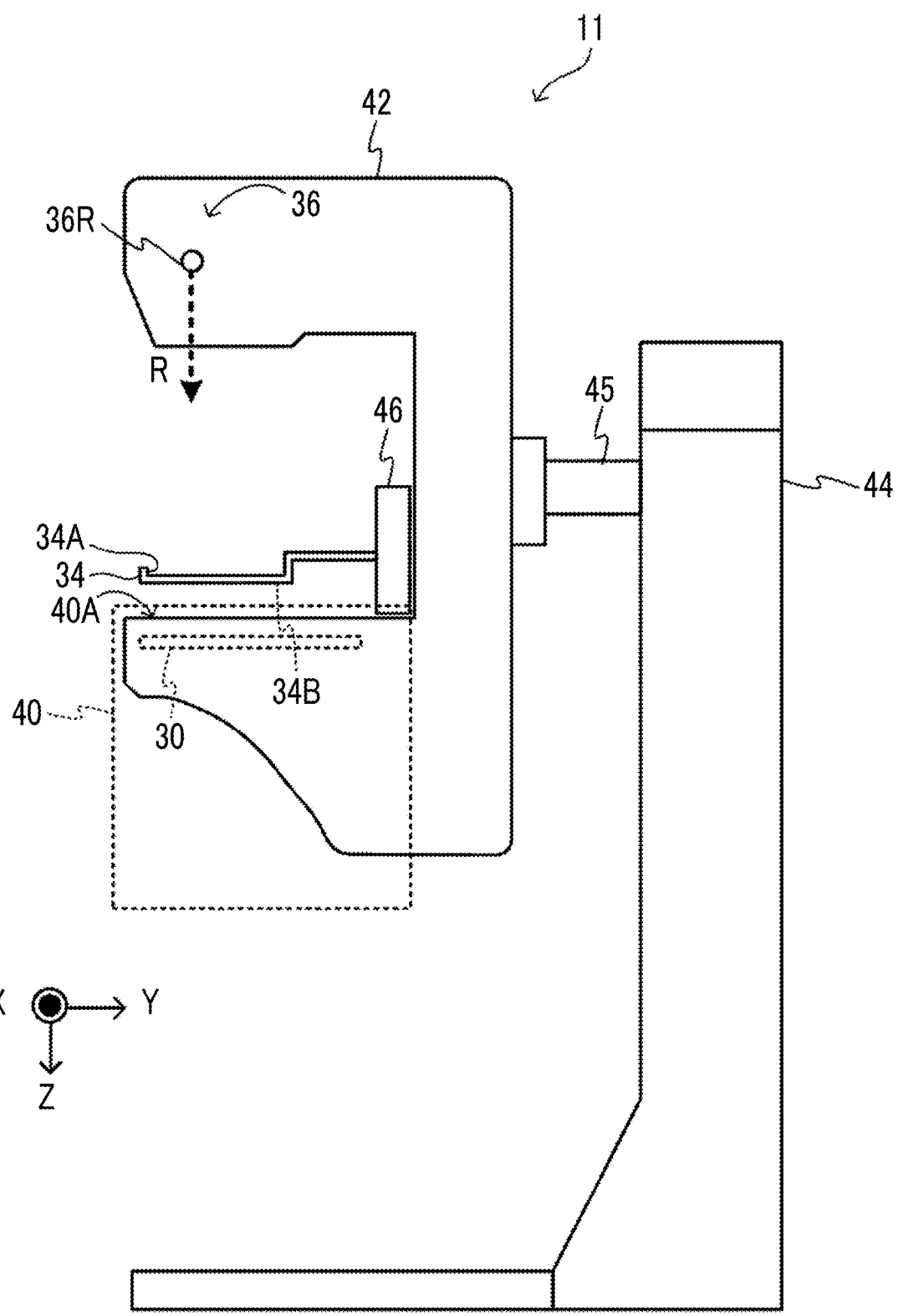
FIG. 13 is a diagram illustrating an example of a mammography apparatus in which a biopsy unit and a moving mechanism are omitted.

Note that, in the embodiment described above, the ultrasound probe 70 is moved by the moving mechanism 72, but the moving mechanism 72 may be omitted, and the operator may manually operate the ultrasound probe 70. In addition, the biopsy unit 60 may be omitted. In a case where the biopsy unit 60 is omitted, the opening portion 34B of the bottom portion 34A of the compression member 34 is also unnecessary, and the operator operates the ultrasound probe 70 on the compression member 34 to acquire the ultrasound image. In a case where the opening portion 34B is omitted, it is desirable that the compression member 34 is formed of a material that easily propagates the ultrasound waves transmitted from the ultrasound probe 70. Examples of the material for the compression member 34 include resins such as polymethylpentene, polycarbonate, acrylic, or polyethylene terephthalate. In particular, polymethylpentene is suitable as the material for the compression member 34 since polymethylpentene has low rigidity, high elasticity, and high flexibility and has suitable values for acoustic impedance that affects the reflectivity of ultrasound waves and an attenuation coefficient that affects the attenuation of ultrasound waves. Note that the members that constitute the compression member 34 are not limited to the above. For example, the members that constitute the compression member 34 may be a film-like member. FIG. 13 illustrates an example of a mammography apparatus 11 in which the biopsy unit 60 and the moving mechanism 72 are omitted.

In the mammography apparatus 11 illustrated in FIG. 13, since the operator checks the ultrasound image while operating the ultrasound probe 70, the display unit 27 is rotated by the mechanism 28 in conjunction with the rotation of the arm part 42. Accordingly, since the posture of the display unit 27 can be maintained before and after the rotation of the arm part 42, the ultrasound image displayed on the display unit 27 can be easily checked while the ultrasound probe 70 is operated.

In addition, a computer including various processors other than the CPU may execute various kinds of processing executed by the CPU executing software (program) in the embodiment described above. As the processors in this case, a programmable logic device (PLD) of which the circuit configuration can be changed after manufacture, such as a field-programmable gate array (FPGA), a dedicated electrical circuitry as a processor having a circuit configuration designed exclusively to execute specific processing, such as an application specific integrated circuit (ASIC), and the like are exemplified. In addition, the various kinds of processing may be executed by one of the various processors or may be executed by a combination of two or more processors of the same kind or different kinds (for example, a combination of a plurality of FPGAs and a combination of a CPU and an FPGA). In addition, the hardware structures of the various processors are more specifically electrical circuitry where circuit elements such as semiconductor elements are combined.

In addition, in the embodiment described above, the aspect in which various programs such as the display processing program are stored (installed) in the ROM 20B in advance has been described, but the disclosure is not limited thereto. Various programs may be provided in a form of being recorded in a recording medium such as a compact disk read only memory (CD-ROM), a digital versatile disk read only memory (DVD-ROM), and a Universal Serial Bus (USB) memory. In addition, the various programs may be provided in a form of being downloaded from an external information processing apparatus or the like via a network.

In addition, the configurations, operations, and the like of the medical image acquisition system 2, the mammography apparatus 10, the console 12, and the like described in the embodiment described above are examples, and may be changed according to a situation within a range not departing from the scope of the present disclosure.

The following supplementary notes are further disclosed with respect to the embodiment described above.

Supplementary Note 1

A mammography apparatus comprising:
a support portion that rotatably supports a radiation source that emits radiation, at a plurality of imaging positions where incidence angles of the radiation to a breast of an examinee are different from each other;
a display unit that is provided in the support portion, and displays an ultrasound image of the breast acquired by an ultrasound probe; and
a mechanism that is provided between the display unit and the support portion, and rotates the display unit in conjunction with rotation of the support portion.

Supplementary Note 2

The mammography apparatus according to Supplementary Note 1,
in which the mechanism is a gimbal mechanism.

Supplementary Note 3

The mammography apparatus according to Supplementary Note 1,
in which the mechanism is a balancing mechanism.

Supplementary Note 4

The mammography apparatus according to Supplementary Note 3,
in which the balancing mechanism is a mechanism that includes a counterweight corresponding to weight of the display unit and supports the counterweight at a position opposite to the display unit with respect to a support point that supports the display unit, and
the counterweight and the display unit are mechanisms rotatably supported at the support point.

Supplementary Note 5

The mammography apparatus according to any one of Supplementary Notes 1 to 4,
in which a rotation axis of the support portion and a rotation axis of the mechanism are parallel to each other.

Supplementary Note 6

The mammography apparatus according to any one of Supplementary Notes 1 to 5,
in which an interval between a rotation axis of the radiation source and a rotation axis of the mechanism is shorter than a farthest position of a detector that detects the radiation, from a rotation axis of the support portion.

Supplementary Note 7

The mammography apparatus according to Supplementary Note 2,
in which the gimbal mechanism includes a detection unit that detects a rotation angle of the radiation source and a rotation driving unit that rotates the display unit, and
the gimbal mechanism drives the rotation driving unit such that a display posture of the display unit becomes a predetermined display posture according to the rotation angle detected by the detection unit.

Supplementary Note 8

A display method of a mammography apparatus including a support portion that rotatably supports a radiation source that emits radiation, at a plurality of imaging positions where incidence angles of the radiation to a breast of an examinee are different from each other, and a display unit that is provided in the support portion and displays an ultrasound image of the breast acquired by an ultrasound probe, in which a mechanism that maintains a display posture of the display unit even in a case where the support portion is rotated is provided between the display unit and the support portion, the display method comprising:

maintaining the display posture of the display unit using the mechanism even in a case where the support portion is rotated.

Supplementary Note 9

A medical image acquisition system comprising:
an ultrasound apparatus including an ultrasound probe for acquiring an ultrasound image; and
the mammography apparatus according to any one of Supplementary Notes 1 to 7.

What is claimed is:

1. A mammography apparatus comprising:
a bracket that rotatably supports a radiation source that emits radiation, at a plurality of imaging positions where incidence angles of the radiation to a breast of an examinee are different from each other;
a display that is provided in the bracket, and displays an ultrasound image of the breast acquired by an ultrasound probe; and
a mechanism that is provided between the display and the bracket, and rotates the display in conjunction with rotation of the bracket.

2. The mammography apparatus according to claim 1, wherein the mechanism is a gimbal mechanism.

3. The mammography apparatus according to claim 2, wherein the gimbal mechanism includes a detector that detects a rotation angle of the radiation source and a rotation mechanism that rotates the display, and
the gimbal mechanism drives the rotation mechanism such that a display posture of the display becomes a predetermined display posture according to the rotation angle detected by the detector.

4. The mammography apparatus according to claim 1, wherein the mechanism is a balancing mechanism.

5. The mammography apparatus according to claim 4, wherein the balancing mechanism is a mechanism that includes a counterweight corresponding to weight of the display and supports the counterweight at a position opposite to the display with respect to a support point that supports the display, and
the counterweight and the display are mechanisms rotatably supported at the support point.

6. The mammography apparatus according to claim 1, wherein a rotation axis of the bracket and a rotation axis of the mechanism are parallel to each other.

7. The mammography apparatus according to claim 1, wherein an interval between a rotation axis of the radiation source and a rotation axis of the mechanism is shorter than a farthest position of a detector that detects the radiation, from a rotation axis of the bracket.

8. A medical image acquisition system comprising:
an ultrasound apparatus including an ultrasound probe for acquiring an ultrasound image; and
the mammography apparatus according to claim 1.

9. A display method of a mammography apparatus including a bracket that rotatably supports a radiation source that emits radiation, at a plurality of imaging positions where incidence angles of the radiation to a breast of an examinee are different from each other, and a display that is provided in the bracket and displays an ultrasound image of the breast acquired by an ultrasound probe, in which a mechanism that maintains a display posture of the display even in a case where the bracket is rotated is provided between the display and the bracket, the display method comprising:
maintaining the display posture of the display using the mechanism even in a case where the bracket is rotated.

* * * * *